Patented Dec. 30, 1941

2,268,533

UNITED STATES PATENT OFFICE 2,268,533

POLYQUATERNARY AMMONIUM SALTS

Charles F. H. Allen, Rochester, N. Y., assignor to Eastman Kodak Company, Rochester, N. Y., a corporation of New Jersey No Drawing. Application February 29, 1940, Serial No. 321,597

9 Claims. (Cl. 260—297)

This invention relates to polyquaternary ammonium salts and to a process for preparing the same.

Polyquaternary ammonium salts have been prepared by reacting diamines with alkyl halides. However, the method is of but limited application, owing, in part, to the unavailability of the diamines. I have now found that polyquaternary ammonium salts of a kind unattainable by the aforesaid prior method can be prepared by reacting tertiary amines with dihalides of the following general formula:

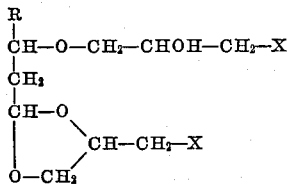

wherein R represents an organic residue, such as an alkyl group and X represents halogen. In this manner, I have obtained polyquaternary ammonium salts containing the following atomic grouping:

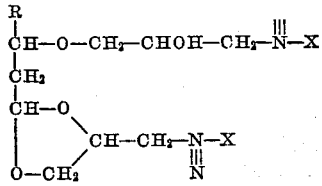

wherein R represents an organic residue such as an alkyl group and X represents a halide radical. These polyquaternary ammonium halides can be converted into other polyquaternary ammonium salts by double decomposition with suitable inorganic salts, e. g. to perchlorates, by double decomposition with sodium perchlorate.

I have found that tertiary amines, such as pyridine, N-alkyl piperidines, and trialkylamines for example react readily with the above formulated dihalides. Heat accelerates the reaction. Such dihalides are prepared for example by reacting a glycerol α-monohalogenohydrin with an unsaturated aldehyde, such as acrolein or crotonaldehyde for example, in the presence of a catalyst. See United States Patent 2,131,998, dated October 4, 1938, for example.

The following examples will serve to demonstrate the manner of obtaining my new quaternary salts. These examples are not intended to limit my invention. The parts given are parts by weight.

*Example 1*

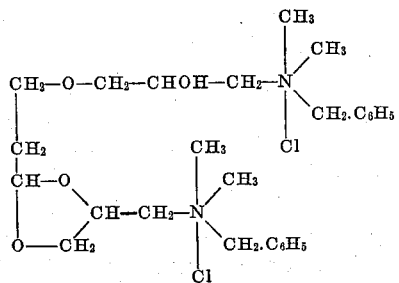

2.5 parts of 2-β-(γ-chloro-β-hydroxypropoxy)-ethyl-5-chloro-methyl-1,3-dioxolane and 2.7 parts of dimethylbenzylamine were mixed together. The mixture was heated for 4 hours at 130° to 140° C. The oily reaction product was cooled, washed with diethyl ether and dried in vacuo at 90° to 100° C. The yield of yellow oil was 4 parts.

*Example 2*

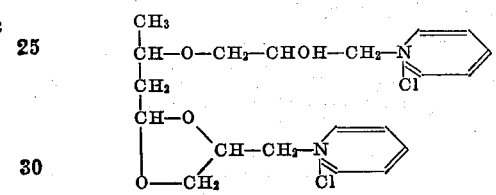

2.7 parts of 2-β-(γ-chloro-β-hydroxypropoxy)-propyl-5-chlormethyl-1,3-dioxolane and 5 parts of pyridine were mixed together. The mixture was heated for 4 hours at 120° C. The waxy reaction product was cooled, washed with diethyl ether and with petroleum ether and dried at 160° C. The yield of wax was 2.5 parts.

*Example 3*

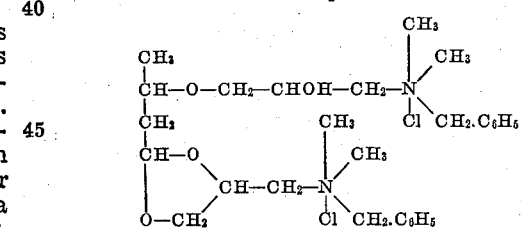

2.7 parts of 2-β-(γ-chloro-β-hydroxypropoxy)-propyl-5-chloromethyl-1,3-dioxolane and 2.8 parts of dimethylbenzylamine were mixed together. The mixture was heated for 5 hours at 130° to 140° C. The waxy reaction product was cooled, washed with diethyl ether and dried in vacuo at 90° to 100° C. The yield of wax was 3.5 parts.

Example 4

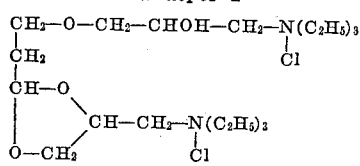

2.5 parts of 2-β-(γ-chloro-β-hydroxypropoxy)-ethyl-5-chloromethyl-1,3-dioxolane and 4.5 parts of triethylamine were mixed together in a sealed glass tube. The tube was heated at 150° C. for 18 hours. The tube was cooled, the waxy product removed and washed successively with diethyl ether, petroleum ether and methyl alcohol. It was then dried in vacuo at 90° to 100° C. The yield of wax was 3 parts.

My new quaternary salts are useful as penetrating agents and dyeing assistants in the treatment of cellulosic textiles.

It is, therefore, apparent that my invention is susceptible of some modification, hence I do not wish to be restricted, excepting insofar as is necessitated by the prior art and the spirit of the appended claims.

What I claim as my invention and desire to be secured by Letters Patent of the United States is:

1. A polyquaternary ammonium salt obtained by the reaction of a tertiary amine with a dihalide of the following general formula:

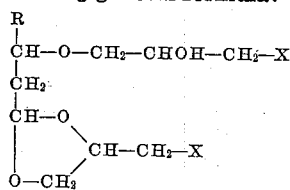

wherein R represents a member selected from the group consisting of hydrogen and alkyl groups, and X represents halogen.

2. A polyquaternary ammonium salt obtained by the reaction of a tertiary amine with a dichloride of the following general formula:

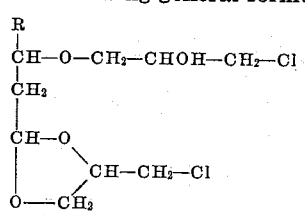

wherein R represents a member selected from the group consisting of hydrogen and alkyl groups.

3. A polyquaternary ammonium salt having the following general formula:

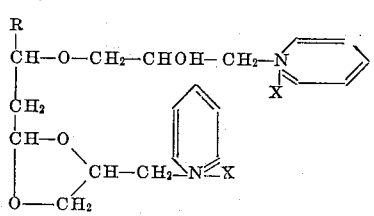

wherein R represents a member selected from the group consisting of hydrogen and alkyl groups and X represents an acid radical.

4. A polyquaternary ammonium salt having the following general formula:

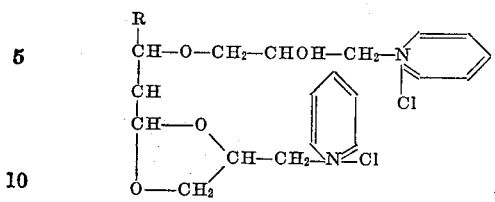

wherein R represents a member selected from the group consisting of hydrogen and alkyl groups.

5. A polyquaternary ammonium salt having the following general formula:

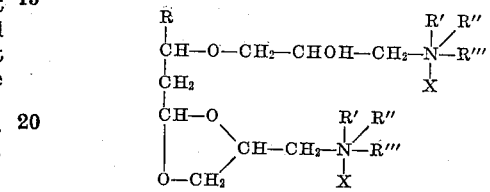

wherein R represents a member selected from the group consisting of hydrogen and alkyl groups and R', R" and R''' represent alkyl groups and X represents an acid radical.

6. A polyquaternary ammonium salt having the following general formula:

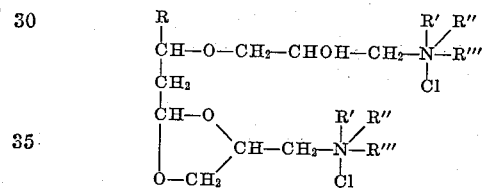

wherein R represents a member selected from the group consisting of hydrogen and alkyl groups and R', R" and R''' represent alkyl groups.

7. A polyquaternary ammonium salt having the following formula:

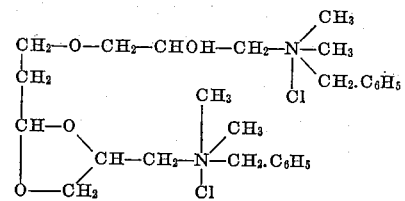

8. A polyquaternary ammonium salt having the following formula:

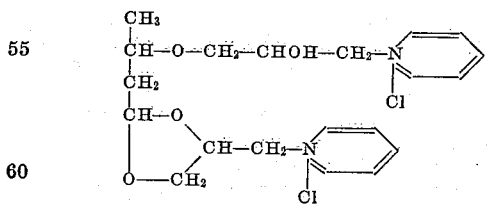

9. A polyquaternary ammonium salt having the following formula:

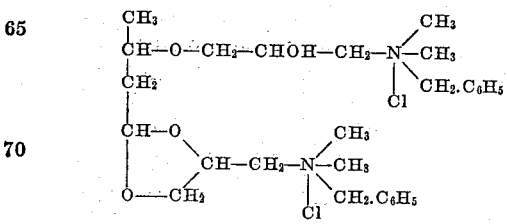

CHARLES F. H. ALLEN.